US012764446B2

(12) United States Patent
Kubota et al.

(10) Patent No.: US 12,764,446 B2
(45) Date of Patent: Oct. 13, 2026

(54) VEHICLE ELECTROACOUSTIC TRANSDUCER

(71) Applicant: FOSTER ELECTRIC COMPANY, LIMITED, Tokyo (JP)

(72) Inventors: Gaku Kubota, Akishima (JP); Atsushi Koga, Akishima (JP)

(73) Assignee: FOSTER ELECTRIC COMPANY, LIMITED, Tokyo (JP)

( * ) Notice: Subject to any disclaimer, the term of this patent is extended or adjusted under 35 U.S.C. 154(b) by 131 days.

(21) Appl. No.: 18/851,650

(22) PCT Filed: Mar. 6, 2023

(86) PCT No.: PCT/JP2023/008417
§ 371 (c)(1),
(2) Date: Sep. 26, 2024

(87) PCT Pub. No.: WO2023/189253
PCT Pub. Date: Oct. 5, 2023

(65) Prior Publication Data

US 2025/0211885 A1 Jun. 26, 2025

(30) Foreign Application Priority Data

Mar. 29, 2022 (JP) ................................ 2022-053454

(51) Int. Cl.
*H04R 1/02* (2006.01)
*B60Q 5/00* (2006.01)

(52) U.S. Cl.
CPC ............... *H04R 1/025* (2013.01); *B60Q 5/00* (2013.01); *H04R 2499/13* (2013.01)

(58) Field of Classification Search
CPC ........ H04R 1/025; H04R 1/026; H04R 1/021; H04R 2499/13; B60Q 5/00
See application file for complete search history.

(56) References Cited

U.S. PATENT DOCUMENTS

2007/0274803 A1* 11/2007 Kusano ................. H04R 1/025 411/81
2018/0310081 A1* 10/2018 Clement ................ B63B 34/10
(Continued)

FOREIGN PATENT DOCUMENTS

JP S50-009952 Y2 1/1975
JP S52-064789 U 5/1977
(Continued)

OTHER PUBLICATIONS

Search Report and Written Opinion in International Application No. PCT/JP2023/008417 dated Jun. 6, 2023, 8 pages.

*Primary Examiner* — Jason R Kurr
(74) *Attorney, Agent, or Firm* — MARSHALL, GERSTEIN & BORUN LLP

(57) ABSTRACT

A vehicle electroacoustic transducer includes: a speaker unit that generates sound; a case that is formed in a box shape and that houses the speaker unit; and an attachment portion that is formed at the case and that is attachable, by a fastener, to a member to be attached which is outside a vehicle cabin, wherein: the attachment portion includes an attachment metal fitting into which the fastener is screwed, and a metal fitting housing portion that houses the attachment metal fitting, and a drain hole for draining water is formed at the metal fitting housing portion.

4 Claims, 5 Drawing Sheets

(56) References Cited

U.S. PATENT DOCUMENTS

| | | | | |
|---|---|---|---|---|
| 2019/0349671 | A1* | 11/2019 | Proni | H04R 1/2826 |
| 2021/0152907 | A1* | 5/2021 | Koranda | H04R 1/026 |

FOREIGN PATENT DOCUMENTS

| | | | |
|---|---|---|---|
| JP | S55-053387 | U | 4/1980 |
| JP | S58-036934 | U | 3/1983 |
| JP | 2021-029003 | A | 2/2021 |
| JP | 2021-029004 | A | 2/2021 |

* cited by examiner

VEHICLE ELECTROACOUSTIC TRANSDUCER

TECHNICAL FIELD

The present invention relates to a vehicle electroacoustic transducer.

RELATED ART

Japanese Patent Application Laid-Open (JP-A) No. 2021-29003 and Japanese Patent Application Laid-Open (JP-A) No. 2021-29004 disclose vehicle electroacoustic transducers in which a speaker unit is fixed within a main body case. The vehicle electroacoustic transducers described in Patent Document 1 and Patent Document 2 have an internal space and an external space of the main body case partitioned from each other using a vibrating body as a boundary, and a ventilation member is provided in a communication hole connecting the spaces so as to allow passage of air and block passage of fluid.

SUMMARY OF THE INVENTION

Problem to be Solved by the Invention

The vehicle electroacoustic transducers described in Japanese Patent Application Laid-Open (JP-A) No. 2021-29003 and Japanese Patent Application Laid-Open (JP-A) No. 2021-29004 are attached to a member to be attached by a fastener such as a bolt. Incidentally, in a vehicle electroacoustic transducer that is provided outside a vehicle cabin, if a state in which water remains at an interface between a fastener such as a bolt and the vehicle electroacoustic transducer, due to the influence of rain or the like, there is a possibility that the fastener and part of the vehicle electroacoustic transducer will deteriorate.

An object of the present invention is to provide a vehicle electroacoustic transducer capable of suppressing degradation due to residual water in a structure in which a vehicle electroacoustic transducer is attached to a member to be attached by a fastener.

Means for Solving the Problem

A vehicle electroacoustic transducer according to a first aspect includes: a speaker unit that generates sound; a case that is formed in a box shape and that houses the speaker unit; and an attachment portion that is formed at the case and that is attachable, by a fastener, to a member to be attached which is outside a vehicle cabin, wherein: the attachment portion includes an attachment metal fitting into which the fastener is screwed, and a metal fitting housing portion that houses the attachment metal fitting, and a drain hole for draining water is formed at the metal fitting housing portion.

In the above-described aspect, the speaker unit is housed in the case, and the attachment portion is formed at the case. Further, the attachment portion includes the attachment metal fitting into which the fastener is screwed, and the metal fitting housing portion that houses the attachment metal fitting. This enables the case to be attached to a member to be attached which is outside the vehicle cabin, together with the speaker unit, by screwing the fastener into the attachment metal fitting in a state in which the attachment metal fitting is housed in the metal fitting housing portion.

Moreover, since the drain hole for draining water is formed at the metal fitting housing portion, even in a case in which water has entered the metal fitting housing portion, the water can be drained from the drain hole, enabling water to be suppressed from remaining in the metal fitting housing portion.

A vehicle electroacoustic transducer according to a second aspect is the vehicle electroacoustic transducer according to the first aspect, wherein the drain hole is formed at plural locations at the metal fitting housing portion.

In the above-described aspect, the drain hole is formed at plural locations. This enables drainage performance to be further improved in comparison to a configuration in which a drain hole is formed at only one location.

A vehicle electroacoustic transducer according to a third aspect is the vehicle electroacoustic transducer according to the first aspect or the second aspect, wherein the drain hole is formed at a corner portion configuring the metal fitting housing portion.

In the above-described aspect, it is possible to suppress water from remaining at the corner portion of the metal fitting housing portion.

A vehicle electroacoustic transducer according to a fourth aspect is the vehicle electroacoustic transducer according to any one of the first aspect to the third aspect, wherein: an insertion hole, into which the attachment metal fitting is insertable, is formed in the metal fitting housing portion; and the drain hole is formed in a side of the metal fitting housing portion which is opposite the insertion hole.

In the above-described aspect, the insertion hole is formed in the metal fitting housing portion, and the attachment metal fitting is configured so as to be insertable into the insertion hole. Moreover, since the drain hole is formed in the side opposite to the insertion hole, water can be drained from the drain hole even in a case in which water has entered from the insertion hole to the back of the metal fitting housing portion.

A vehicle electroacoustic transducer according to a fifth aspect is the vehicle electroacoustic transducer according to any one of the first aspect to the fourth aspect, wherein an inclined portion, which is inclined toward the drain hole, is formed at an inner wall of the metal fitting housing portion.

In the above-described aspect, water that has entered the metal fitting housing portion is guided to the drain hole by the inclined portion. This enables water in the metal fitting housing portion to be efficiently drained.

Effect of the Invention

The vehicle electroacoustic transducer of the present invention enables degradation due to residual water droplets to be suppressed in a structure in which the vehicle electroacoustic transducer is attached to a member to be attached by a fastener.

MODE FOR IMPLEMENTING THE INVENTION

Explanation follows regarding a vehicle electroacoustic transducer 10 according to an exemplary embodiment, with reference to the drawings. It should be noted that the arrow FR, the arrow UP, and the arrow RH illustrated in each of the drawings, as appropriate, respectively indicate a frontward direction, an upward direction, and a rightward direction of the vehicle electroacoustic transducer 10. However, a front-rear direction, an up-down direction, and a left-right direction of the vehicle electroacoustic transducer 10 are set for simplicity of explanation, and do not necessarily coincide with a front-rear direction, an up-down direction, and a left-right direction in a state in which the vehicle electroacoustic transducer 10 is attached to a member to be attached.

Overall Configuration of the Vehicle Electroacoustic Transducer 10

Figure 1:
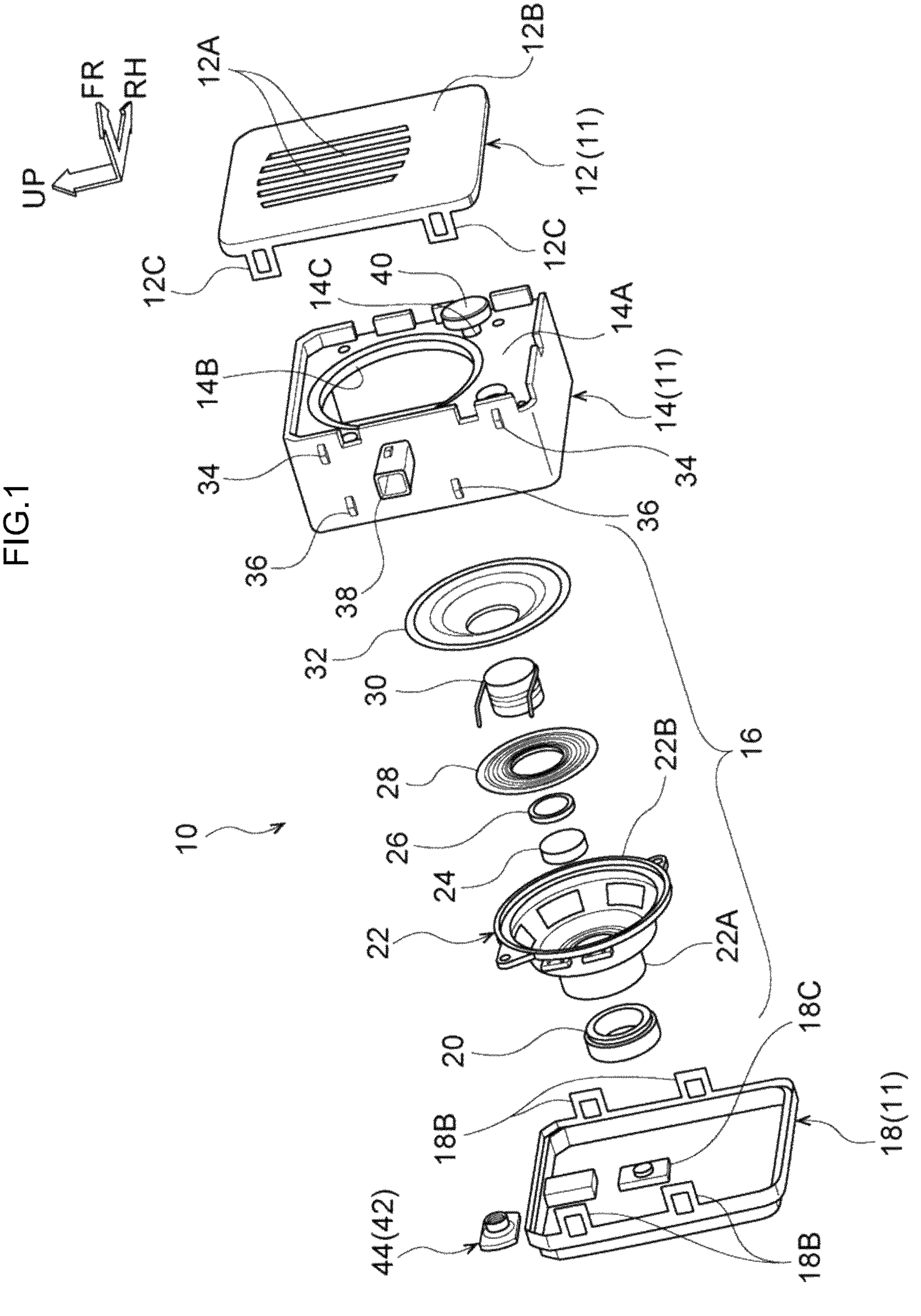
FIG. 1 is an exploded perspective view of a vehicle electroacoustic transducer according to an exemplary embodiment.

As illustrated in FIG. 1, the vehicle electroacoustic transducer 10 of the present exemplary embodiment mainly includes a front cover 12, a case main body 14, a speaker unit 16, and a rear cover 18. A case 11 is configured by the front cover 12, the case main body 14, and the rear cover 18, and the speaker unit 16 is housed in the case 11.

As an example of the vehicle electroacoustic transducer 10 of the present exemplary embodiment, the electroacoustic transducer 10 is installed in a power unit chamber that is provided outside a vehicle cabin of a vehicle, and is configured so as to be attached to a member to be attached 100 (see FIG. 4) that is provided in the power unit chamber. Moreover, as an example of the vehicle electroacoustic transducer 10 of the present exemplary embodiment, the vehicle electroacoustic transducer 10 is used as an acoustic vehicle alerting system (AVAS) that generates sound during low-speed travel in a state of being installed at a vehicle, to inform a pedestrian of the proximity of the vehicle.

First, explanation follows regarding the speaker unit 16 that configures the vehicle electroacoustic transducer 10 of the present exemplary embodiment, after which detailed explanation follows regarding the front cover 12, the case main body 14, and the rear cover 18 which configure the case 11.

Speaker Unit 16

The speaker unit 16 mainly includes a yoke 20, a frame 22, a magnet 24, a top plate 26, a damper 28, a voice coil 30, and a diaphragm 32.

Figure 2:
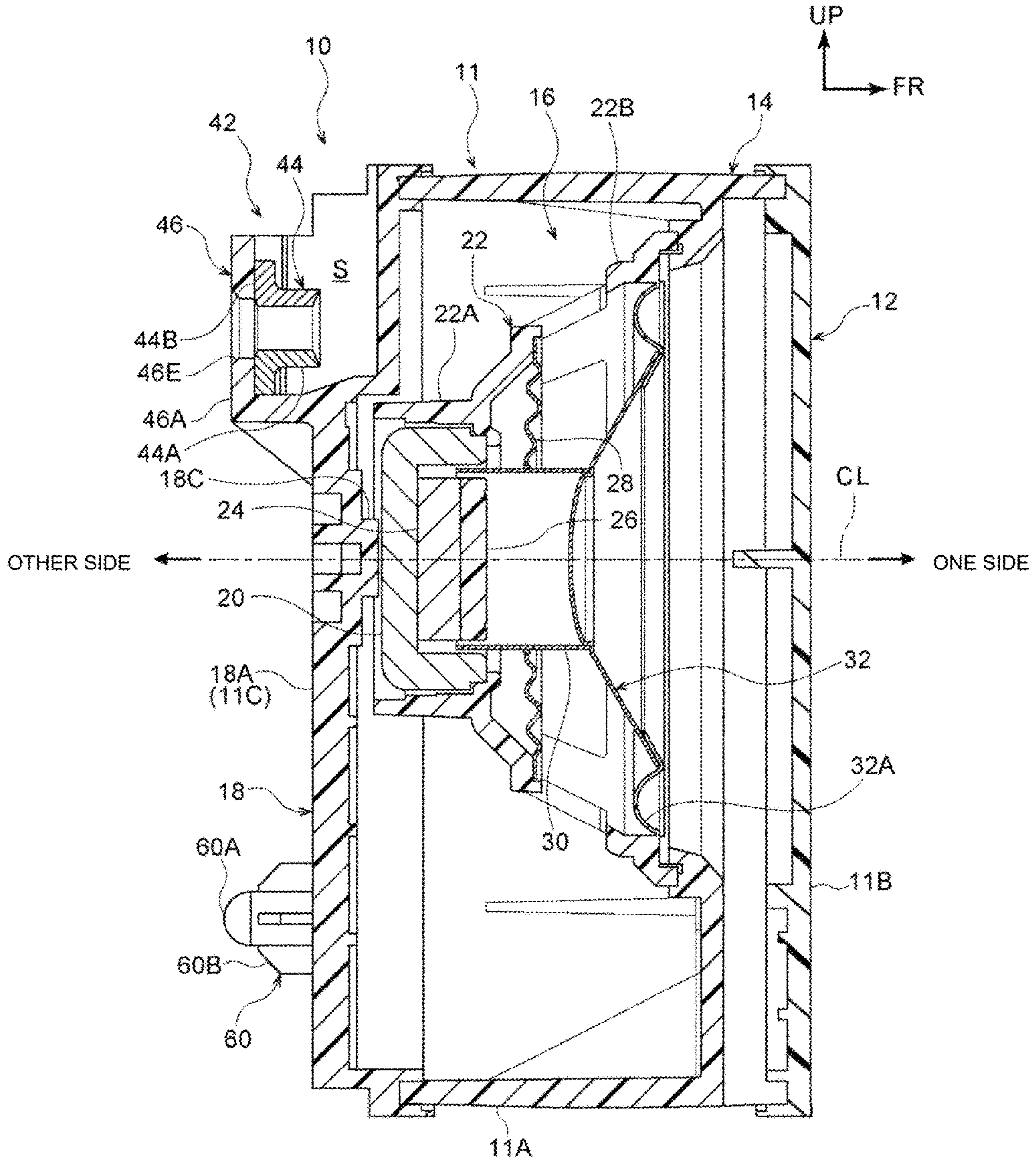
FIG. 2 is a cross-sectional view of a vehicle electroacoustic transducer according to an exemplary embodiment, as seen from the left side.

As illustrated in FIG. 2, the frame 22 is a substantially stepped cylindrical shape including a small diameter portion 22A and a tapered portion 22B, and as an example, is formed of a resin member. The small diameter portion 22A of the frame 22 is disposed at a rear side, the tapered portion 22B is disposed at a front side, and a direction of a central axis CL of the frame 22 coincides with the front-rear direction. In the following explanation, a front side of the speaker unit 16 including the frame 22 is sometimes referred to as one side in the direction of the central axis CL, while a rear side of the speaker unit 16 is sometimes referred to as the other side in the direction of the central axis CL.

The tapered portion 22B is connected to the small diameter portion 22A at an axial direction other side end portion (axial direction other end portion), and is formed in a shape that gradually increases in diameter from the axial direction other end portion toward an axial direction one side. The diaphragm 32 is attached to an axial direction one side end portion (axial direction one end portion) of the tapered portion 22B.

The diameter of the diaphragm 32 gradually increases from an axial direction other end side toward an axial direction one end side, and the voice coil 30 is attached to a rear face of a central portion of the diaphragm 32. An annular groove 32A is formed at an outer peripheral end portion of the diaphragm 32 so as to be convex toward the axial direction other end side. A portion of the diaphragm 32 which is closer to the outer periphery than the groove 32A is fixed to an axial direction one end portion of the frame 22, and an opening at an axial direction one end side of the frame 22 is closed by the diaphragm 32.

Moreover, an axial direction one side portion of the frame 22 is connected to an axial direction one end portion of the case main body 14, which is described below. Accordingly, an external space and an internal space of the case main body 14 are partitioned by the diaphragm 32.

The yoke 20, the magnet 24, and the top plate 26 are disposed inside the small-diameter portion 22A of the frame 22. The yoke 20 is formed in a bottomed cylindrical shape with a front side opened, and is made of a magnetic material. A front end portion of the yoke 20 is in contact with the frame 22, and a rear end portion of the yoke 20 is in contact with the rear cover 18. Accordingly, the yoke 20 is held in a state sandwiched between the frame 22 and the rear cover 18, which is described below.

The magnet 24 is a substantially cylindrical shape with a smaller diameter than the yoke 20, and as an example, the magnet 24 of the present exemplary embodiment is formed of a neodymium magnet. Further, the magnet 24 is disposed inside the yoke 20, and a rear face of the magnet 24 is in contact with a bottom portion of the yoke 20.

The top plate 26 is stacked on a front side of the magnet 24. The top plate 26 is formed in a substantially cylindrical shape that is thinner than the magnet 24, and is made of a magnetic material. A magnetic circuit is configured by the yoke 20, the magnet 24, and the top plate 26.

A gap is provided between the top plate 26 and the yoke 20, and an axial direction other end portion of the voice coil 30 is inserted into this gap. The voice coil 30 is formed by winding a conductive wire around a bobbin, which is not illustrated in the drawings, in a cylindrical shape, and an outer diameter of the voice coil 30 is slightly larger than the magnet 24 and the top plate 26. An axial direction one end portion of the voice coil 30 is fixed to the central portion of the diaphragm 32, and the diaphragm 32 is configured to deform in response to displacement of the voice coil 30.

The damper 28 is fixed to an outer peripheral surface of the voice coil 30. The damper 28 is substantially disc-shaped with a radial direction central portion that is open, and is formed of a flexible member. The damper 28 is formed in a substantially wave-shaped cross-sectional shape, with an inner peripheral end portion of the damper 28 fixed to an axial direction central portion of the voice coil 30, and an outer peripheral end portion of the damper 28 fixed to the frame 22. Accordingly, the voice coil 30 is supported by the damper 28 so as to be movable in an axial direction inside the frame 22.

Both end portions of the conductive wire that configures the voice coil 30 are connected to terminals that are not illustrated in the drawings, and power is supplied to the voice coil 30 from an external power source of the vehicle electroacoustic transducer 10 via the terminals.

The speaker unit 16 is configured as described above, and by power being supplied to the voice coil 30 and a current flowing through the voice coil 30, the voice coil 30 reciprocatingly moves in the axial direction to vibrate the diaphragm 32. The diaphragm 32 is vibrated to generate sound.

Overall Configuration of the Case 11

Next, explanation follows regarding the case 11 that houses the speaker unit 16.

Figure 3:
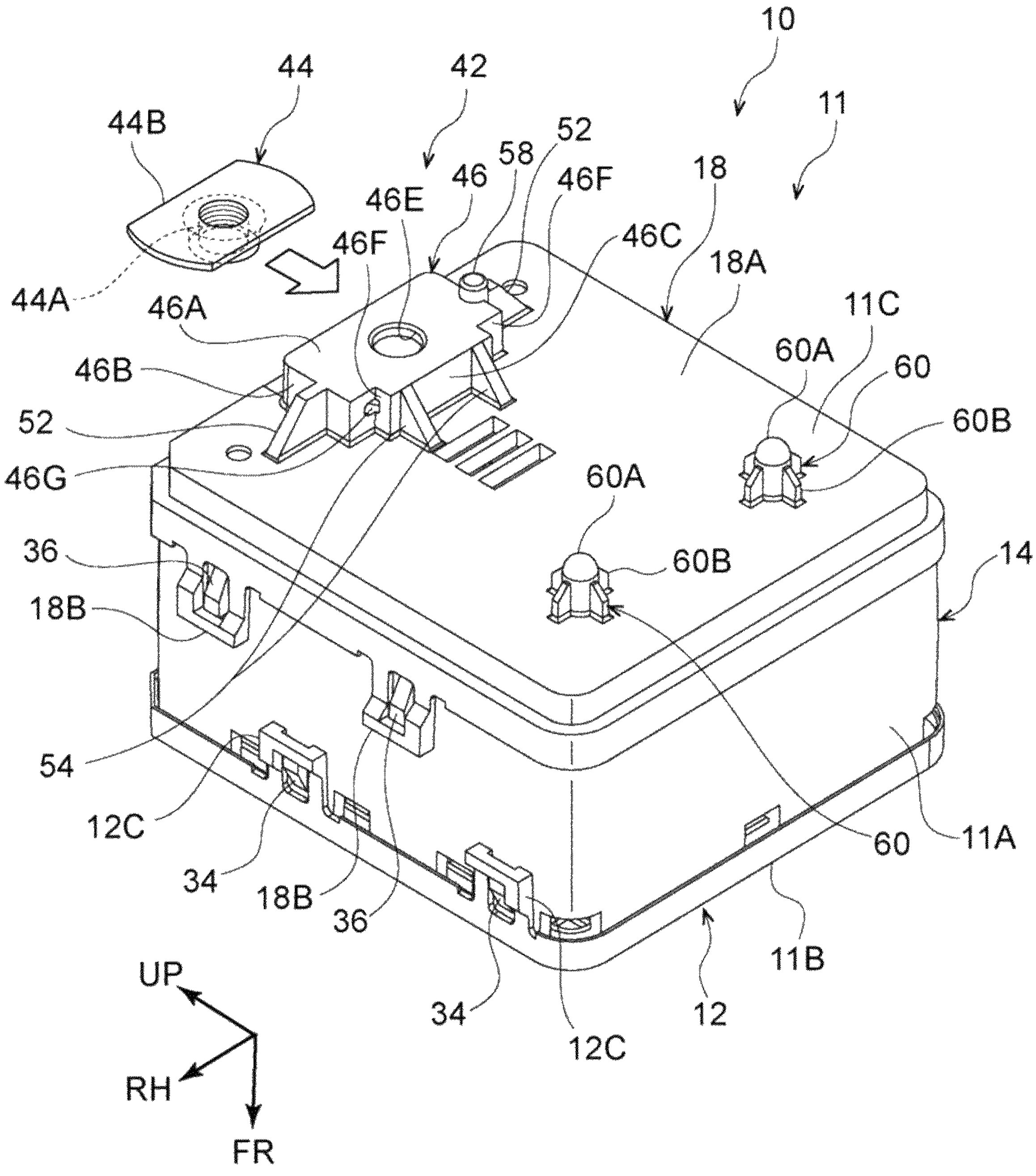
FIG. 3 is a perspective view of a vehicle electroacoustic transducer according to an exemplary embodiment, illustrating a state prior to insertion of an attachment metal fitting.

As illustrated in FIG. 3, the case 11 includes a peripheral wall portion 11A that is formed in a box shape and houses the speaker unit 16, and that also surrounds the periphery of the speaker unit 16, a front wall portion 11B that is disposed at one end side (a front side) of the peripheral wall portion 11A, and a rear wall portion 11C that is disposed at another end side (a rear side) of the peripheral wall portion 11A.

As illustrated in FIG. 1, the case 11 is formed in a substantially box shape including the case main body 14, the front cover 12, and the rear cover 18, the front cover 12 being attached to a front side of the case main body 14, and the rear cover 18 being attached to a rear side of the case main body 14. For this reason, the case main body 14 configures the peripheral wall portion 11A, the front cover 12 configures the front wall portion 11B, and the rear cover 18 configures the rear wall portion 11C. Moreover, the rear cover 18 includes an attachment surface 18A that is disposed opposite to the member to be attached 100 (see FIG. 4). It should be noted that although the case 11 has a three-part structure including the case main body 14, the front cover 12, and the rear cover 18 in the present exemplary embodiment, there is no limitation thereto, and the case 11 may have an integral or two-part structure. Alternatively, the case may have a structure divided into four or more sections.

Case Main Body 14

The case main body 14 is formed in a substantially rectangular cylindrical shape with both sides opened, and as an example, is formed of a resin member such as a fiber reinforced resin. The speaker unit 16 is held by the case main body 14. Further, plural forward protruding portions 34 and plural rearward protruding portion 36 are formed on an outer peripheral surface of the case main body 14.

Two forward protruding portions 34 are respectively formed on a right side face and a left side face of a front portion of the case main body 14, and are configured so as to engage with a front claw portion 12C of the front cover 12, which is described below. Further, two rearward protruding portions 36 are respectively formed on the right side face and the left side face of the case main body 14, further to the rear side than the forward protruding portions 34, and are configured so as to engage with a rear side claw portions 18B of the rear cover 18, which are described below.

A connector 38 is provided at the left side face of the case main body 14. The connector 38 protrudes leftward from the case main body 14, and a terminal or the like at the side of an external device, which is not illustrated in the drawings, is connected to the connector 38.

The case main body 14 is provided with a partition wall 14A that partitions an internal space of the case main body 14 into a forward side and a rearward side, with the front-rear direction serving as a plate thickness direction. A circular through hole 14B is formed in the partition wall 14A, and the through hole 14B is closed by the diaphragm 32 of the speaker unit 16.

Moreover, the partition wall 14A is provided with a plug 40 that is made of resin. The plug 40 is attached to a communication portion 14C that is formed in the partition wall 14A. The communication portion 14C is formed by a through hole having a smaller diameter than the through hole 14B so as to communicate between an external space that is further to the front side than the partition wall 14A and an internal space that is further to the rear side than the partition wall 14A. Moreover, the communication portion 14C is provided with a filter member which is not illustrated in the drawings and which permits passage of air and blocks passage of liquid, and the filter member is protected by the plug 40.

Front Cover 12

The front cover 12 is disposed at the front side of the case main body 14, and the front cover 12 is attached to the front side (the diaphragm 32 side) of the case main body 14. The front cover 12 is formed in a substantially rectangular plate shape with the front-rear direction serving as a plate thickness direction, and as an example, is formed of a resin member such as a fiber reinforced resin.

Further, plural slits 12A are formed in the front cover 12, and sound generated by the diaphragm 32 of the speaker unit 16 vibrating is output to the outside of the vehicle electroacoustic transducer 10 through the slits 12A.

The plural slits 12A are formed in the left-right direction, and each slit 12A extends in the up-down direction. Moreover, as an example, the slits 12A of the present exemplary embodiment are configured with a labyrinth structure, and have a structure that suppresses fluid from entering from a front face (front surface) toward a rear face (rear surface) of the front cover 12.

The slits 12A are formed in a portion of the case main body 14 which faces the through hole 14B, and a portion of the front cover 12 which faces a portion where the plug 40 (filter member) is provided is a closed portion 12B in which the slits 12A are not formed.

The front cover 12 is provided with four front claw portions 12C. More specifically, two front claw portions 12C extend toward the rear side from a left-side end portion of the front cover 12. Similarly, two front claw portions, which are not illustrated in the drawings, extend toward the rear side from a right-side end portion of the front cover 12. Each of the front claw portions 12C is formed with a locking hole into which a forward protruding portion 34 of the case main body 14 is inserted, and the front cover 12 is locked by the forward protruding portion 34 entering the locking hole of the front claw portion 12C.

Rear Cover 18

The rear cover 18 is disposed at the rear side of the case main body 14, and the rear cover 18 is attached to the rear side of the case main body 14 (the side opposite to the diaphragm 32). The rear cover 18 is formed in a substantially rectangular plate shape with the front-rear direction serving as a plate thickness direction, and as an example, is formed of a resin member such as a fiber reinforced resin. The rear cover 18 seals a space in the case main body 14 at the side opposite to the diaphragm 32.

The rear cover 18 is provided with four rear claw portions 18B. More specifically, two rear claw portions 18B extend toward the front side from a left-side end portion of the rear cover 18. Similarly, two rear claw portions 18B extend toward the front side from a right-side end portion of the rear cover 18. Each of the rear claw portions 18B is formed with a locking hole into which a rear protruding portion 36 of the case main body 14 is inserted, and the rear cover 18 is locked by the rear protruding portion 36 entering the locking hole of the rear claw portion 18B.

A support portion 18C is provided at a front face (rear surface) of the rear cover 18. The support portion 18C bulges out from the front face of the rear cover 18 toward the front side, and a distal end of the support portion 18C is formed in a substantially cylindrical shape. As illustrated in FIG. 2, in a state in which the vehicle electroacoustic transducer 10 is assembled, a rear face of the yoke 20 is pressed against the support portion 18C.

Attachment Portion 42

As illustrated in FIG. 3, an attachment portion 42 that attaches to the member to be attached 100 is provided at the attachment surface 18A, which is the rear face of the rear cover 18. In other words, the attachment portion 42 is formed so as to be capable of attaching to the member to be attached 100 by bulging out from the rear wall portion 11C toward the side opposite to a front wall portion 11B side. The attachment portion 42 is formed at an outer side of the rear cover 18, and includes an attachment metal fitting 44 into which a bolt 102 (see FIG. 4), which serves as a fastener, is screwed, and a metal fitting housing portion 46 that houses the attachment metal fitting 44.

The metal fitting housing portion 46 is integrally formed with the case main body 14 so as to bulge out rearward from the attachment surface 18A, and is formed in a substantially rectangular shape as seen from the rear side. More specifically, the metal fitting housing portion 46 includes a rear wall 46A, left and right side walls 46B, a lower wall 46C, and an upper wall 46D (see FIG. 4).

The rear wall 46A configures a rear portion of the metal fitting housing portion 46, and extends in the up-down direction and the left-ride direction with the front-rear direction serving as a plate thickness direction. Further, an insertion hole 46E is formed in a central portion of the rear wall 46A. The insertion hole 46E is formed in a substantially circular shape, and is sized so as to allow the bolt 102 for fastening the case 11 to the member to be attached 100 to pass therethrough (see FIG. 4).

The side walls 46B respectively extend forward from both left and right end portions of the rear wall 46A, and the side walls 46B respectively extend in the up-down direction and the front-rear direction with the left-right direction serving as a plate thickness direction. Further, each side wall 46B is provided with a reinforcing rib 52. The reinforcing ribs 52 are formed in a substantially trapezoidal shape as seen from a plate thickness direction, with the up-down direction serving as the plate thickness direction. The left and and right side walls 46B and the attachment surface 18A are connected by the reinforcing ribs 52.

A positioning pin 58 is formed at the left side wall 46B. The pin 58 is integrally formed with the metal fitting housing portion 46, and protrudes further to the rear side than the rear wall 46A. Further, the pin 58 is formed in a substantially cylindrical shape, and is inserted into a positioning hole, which is not illustrated in the drawings, that is formed in the member to be attached 100.

The lower wall 46C extends forward from a lower end portion of the rear wall 46A, and the lower wall 46 C extends in the front-rear direction and the left-right direction with the up-down direction serving as a plate thickness direction. A left and right pair of reinforcing ribs 54 is provided at the lower wall 46C. The reinforcing ribs 54 are formed in a substantially triangular shape as seen from the plate thickness direction, with the left-right direction serving as the plate thickness direction. The lower wall 46C and the attachment surface 18A are connected by the reinforcing ribs 54.

An inverted corner portion 46F is provided between the left and right side walls 46B and the lower wall 46C. Each of a left and right pair of corner portions 46F is formed with a notch portion 46G serving as a drain hole for draining water. The notch portion 46G is formed across the side wall 46B and the lower wall 46C, and is configured so as to be able to drain water from two directions, namely the up-down direction and the left-right direction. It should be noted that although only the notch portion 46G formed in the left corner portion 46F is visible in FIG. 3, a notch portion 46G is similarly formed in the right corner portion 46F.

As described above, in the present exemplary embodiment, as an example, the notch portion 46G is formed at plural locations in the metal fitting housing portion 46. Each of the notch portions 46G is formed by penetrating a portion of the corner portion 46F in a circular manner. Moreover, the notch portion 46G is formed at the opposite side of the metal fitting housing portion 46 in the up-down direction to an insertion hole 46H, which is described below.

Figure 4:
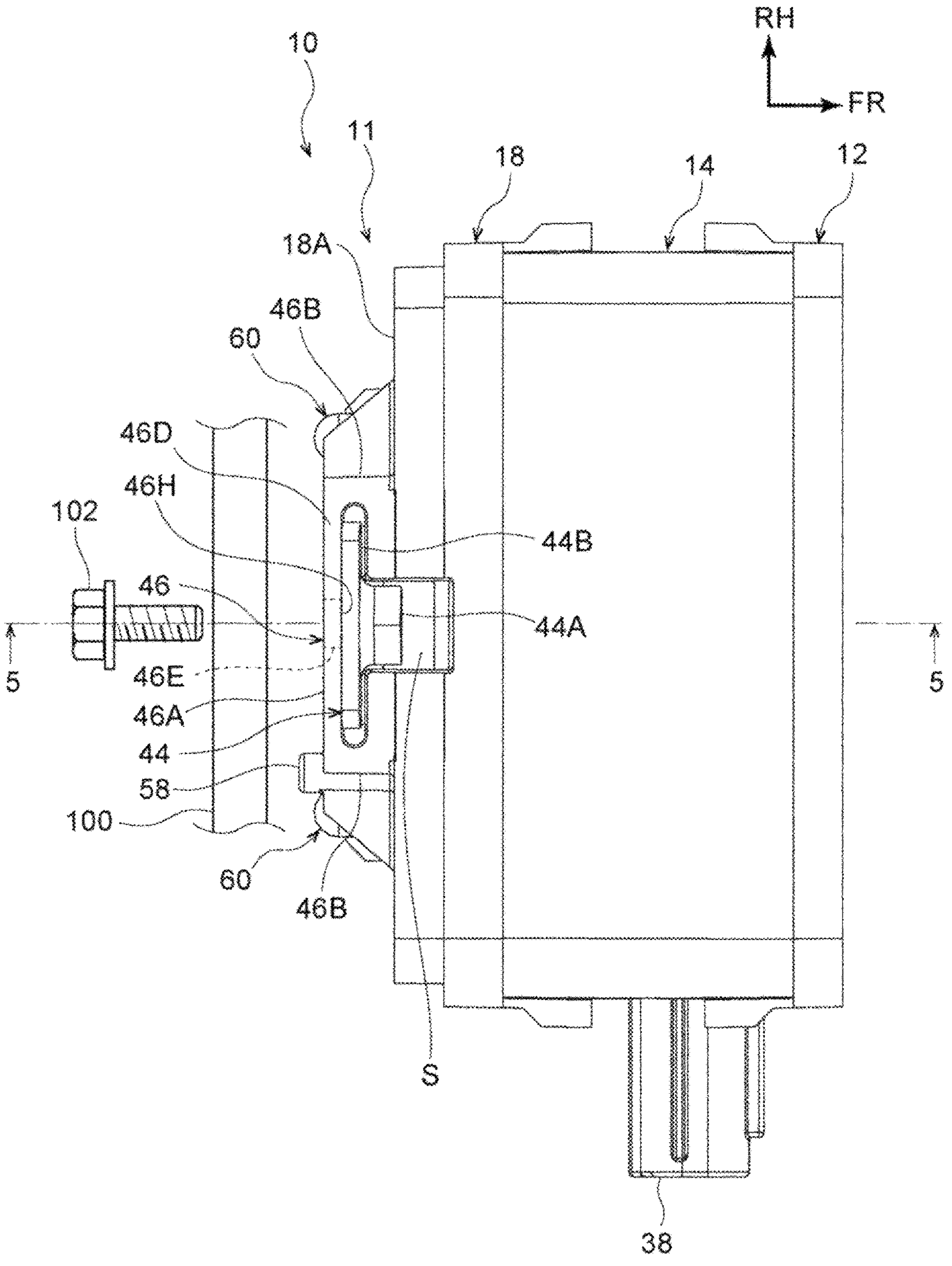
FIG. 4 is a top view of a vehicle electroacoustic transducer according to an exemplary embodiment.

As illustrated in FIG. 4, the upper wall 46D extends forward from an upper end of the rear wall 46A, and extends in the front-rear direction and the left-right direction with the up-down direction serving as a plate thickness direction. The insertion hole 46H through which the attachment metal fitting 44 can be inserted is formed in the upper wall 46D.

The insertion hole 46H is formed in a substantially T-shaped shape, including a left-right extending portion that extends to the left and right as seen from the top surface, and a front-rear extending portion that extends toward the front side from a central portion of the left-right extending portion. The front-rear extending portion of the insertion hole 46H extends further forward than the attachment surface 18A of the rear cover 18. For this reason, the attachment portion 42 is formed in a shape that enables the attachment metal fitting 44 to be attached and detached by providing a gap S between the metal fitting housing portion 46 and the attachment metal fitting 44 in a state in which the attachment metal fitting 44 is housed in the metal fitting housing portion 46. The gap S is provided between the metal fitting housing portion 46 and the attachment metal fitting 44 at the front-rear extending portion and the left-right extending portion of the insertion hole 46H.

Figure 5:
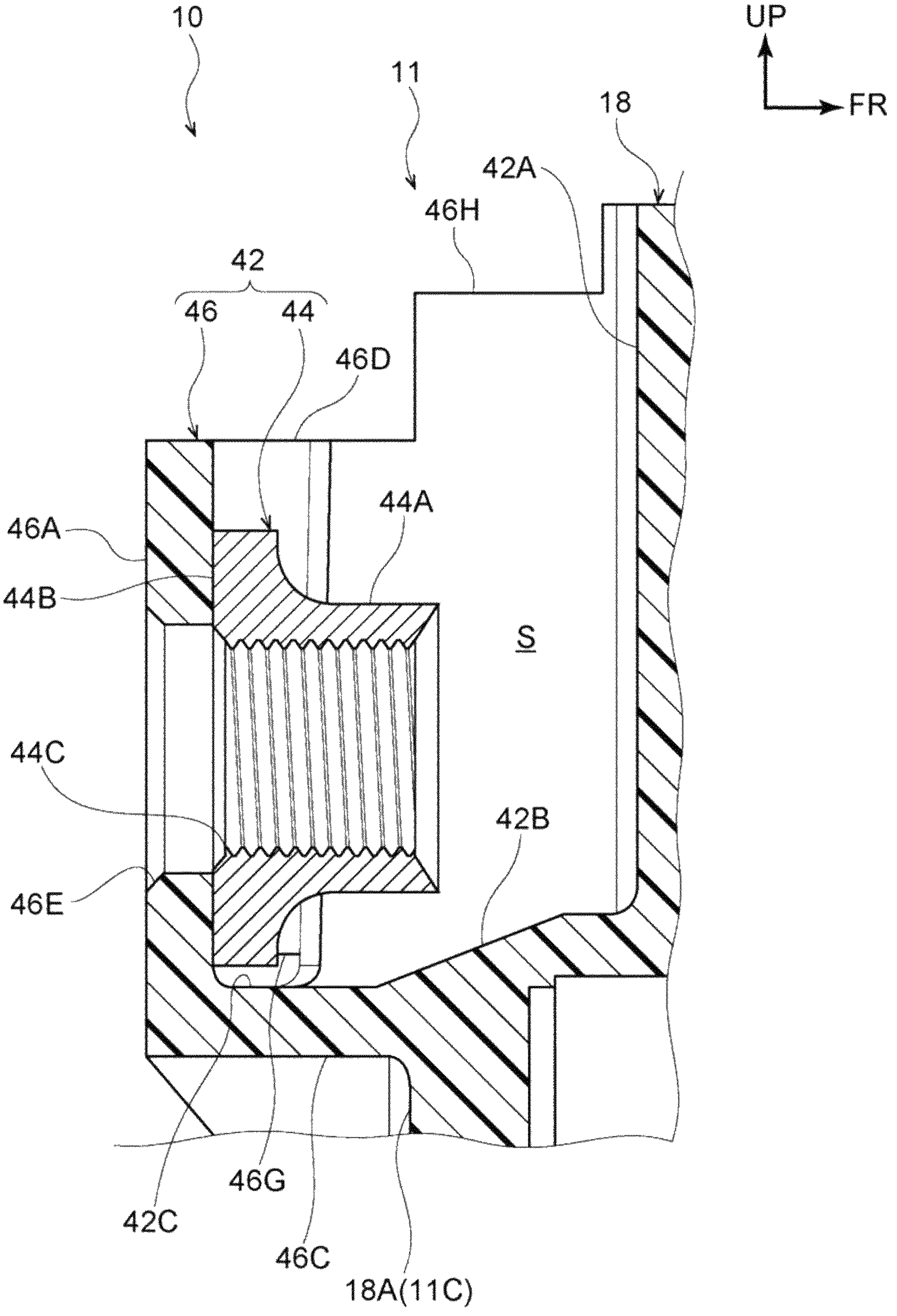
FIG. 5 is a cross-sectional view illustrating a state taken along the line 5-5 in FIG. 4.

As illustrated in FIG. 5, an inner wall of the metal fitting housing portion 46 of the attachment portion 42 includes a vertical wall portion 42A, an inclined portion 42B, and a front-rear wall portion 42C, as seen from the left-right direction. The vertical wall portion 42A configures an inner wall at a front side of the insertion hole 46H, and extends in the up-down direction. The vertical wall portion 42A extends further upward than the rear wall 46A that faces the vertical wall portion 42A in the front-rear direction.

The inclined portion 42B and the front-rear wall portion 42C configure a bottom wall of the insertion hole 46H and extend in the front-rear direction. The front-rear wall portion 42C extends forward from a lower end of the rear wall 46A to a central portion of the insertion hole 46H in the front-rear direction. The front-rear wall portion 42C and the vertical wall portion 42A are connected by the inclined portion 42B.

The inclined portion 42B is inclined downward from the vertical wall portion 42A toward the front-rear wall portion 42C. Both left and right end portions of the front-rear wall portion 42C are respectively connected to an edge portion forming the notch portion 46G. In other words, the inclined portion 42B that is formed at the inner wall of the metal fitting housing portion 46 is inclined toward the notch portion 46G.

As illustrated in FIG. 3 and FIG. 4, the attachment metal fitting 44 is formed separately from the case 11. The attachment metal fitting 44 is a so-called T-shaped nut including a cylindrical portion 44A and a flange portion 44B, and in the present exemplary embodiment, as an example, the attachment metal fitting 44 is formed of a steel material.

The flange portion 44B extends from the cylindrical portion 44A in a radial direction of the cylindrical portion 44A, with the front-rear direction serving as a plate thickness direction. The flange portion 44B is formed in a horizontally long shape with a length in one direction of two directions orthogonal to the plate thickness direction being longer than a length in the other direction. In the present exemplary embodiment, the flange portion 44B extends in the left-right direction and the vertical direction, and is formed in a horizontally long shape with a length in the left-right direction that is longer than a length in the up-down direction.

Moreover, the cylindrical portion 44A of the attachment metal fitting 44 is formed with a screw hole 44C that communicates with the insertion hole 46E in a state in which the attachment metal fitting 44 is housed in the metal fitting housing portion 46, and to which the bolt 102 is screwed. More specifically, as illustrated in FIG. 5, in a state in which the attachment metal fitting 44 is inserted into the insertion hole 46H of the metal fitting housing portion 46, the screw hole 44C that is formed in the attachment metal fitting 44 communicates with the insertion hole 46E of the metal fitting housing portion 46.

The attachment portion 42 is configured as described above, and the attachment portion 42 of the case 11 is fixed to the member to be attached 100 by inserting the bolt 102 through the insertion hole 46E of the metal fitting housing portion 46 and screwing the bolt 102 into the screw hole 44C of the attachment metal fitting 44. At this time, the member to be attached 100 and the rear wall 46A of the metal fitting housing portion 46 are in a state of being sandwiched between the attachment metal fitting 44 and the bolt 102.

Boss Portion 60

As illustrated in FIG. 3, two boss portions 60 bulge out from the attachment surface 18A of the case 11. One of the two boss portions 60 is provided near the lower right corner of the attachment surface 18A, while the other boss portion 60 is provided near the lower left corner of the attachment surface 18A. In other words, the attachment portion 42 is formed at one end portion of the attachment surface 18A, and the boss portions 60 are formed at the other end portion of the attachment surface 18A.

The respective boss portions 60 include a main body portion 60A and ribs 60B. The main body portion 60A is formed in a substantially cylindrical shape, and a distal end of the main body portion 60A is formed in a substantially spherical shape. Four ribs 60B are formed at equal intervals around the periphery of the main body portion 60A. The respective ribs 60B connect the main body portion 60A and the attachment surface 18A together.

As illustrated in FIG. 2, the distal end of the main body portion 60A of the boss portion 60 is positioned further to the rear side than the rear wall 46A of the metal fitting housing portion 46 that configures the attachment portion 42. Namely, the height of the boss portion 60 with respect to the attachment surface 18A is higher than the height of the attachment portion 42 with respect to the attachment surface 18A. Accordingly, when the case 11 is attached to the planar member to be attached 100, the main body portion 60A of the boss portion 60 is pressed against the member to be attached 100.

Operation

Next, explanation follows regarding operation of the present exemplary embodiment.

In the vehicle electroacoustic transducer 10 according to the present exemplary embodiment, the speaker unit 16 is housed in the case 11. Further, as illustrated in FIG. 3, the case 11 includes the peripheral wall portion 11A, the front wall portion 11B, and the rear wall portion 11C. Moreover, since the attachment portion 42 is formed at the case 11, the case 11 can be attached to the member to be attached 100 via the attachment portion 42.

The attachment portion 42 bulges out from the rear wall portion 11C of the case 11 toward a side opposite (rear side) to the front wall portion 11B side. This enables a case to be attached in a smaller space compared to a configuration in which an attachment portion is provided around the peripheral wall portion 11A. Namely, in a configuration in which a flange extends from the peripheral wall portion 11A of the case 11 in the left-right direction or in the up-down direction, there is a possibility that the flange may interfere with peripheral components. In contrast, in the vehicle electroacoustic transducer 10 of the present exemplary embodiment, the attachment portion 42 is provided at a position overlapping with the case 11 in the front-rear direction, enabling the case 11 to be attached to the member to be attached 100 even in a case in which different components are disposed around the peripheral wall portion 11A.

Moreover, in the present exemplary embodiment, the attachment metal fitting 44 is configured by a so-called outsert structure in which the attachment metal fitting 44 is inserted into the insertion hole 46 H of the metal fitting housing portion 46. This enables the interface between the case 11 and the attachment metal fitting 44 to be suppressed from deteriorating due to the influence of water or the like in comparison to a structure of an insert in which the attachment metal fitting 44 is integrally molded with the metal fitting housing portion 46 (case 11).

Moreover, as illustrated in FIG. 4, in the present exemplary embodiment, when the case 11 is attached to the member to be attached 100 by the bolt 102, which is a fastener, the bolt 102 and the attachment metal fitting 44 are screwed together in a state in which the bolt 102 is inserted through the insertion hole 46E that is formed in the metal fitting housing portion 46. As a result, the rear wall 46A of the metal fitting housing portion 46 is in a s state of being sandwiched between the attachment metal fitting 44 and the bolt 102, enabling the case 11 to be more firmly attached to the member to be attached 100. Moreover, attaching the case 11 to the member to be attached 100 via the metal fitting housing portion 46 enables the area in contact with the member to be attached 100 to be increased, enabling the load to be dispersed.

Moreover, in the present exemplary embodiment, the flange portion 44B of the attachment metal fitting 44 is configured in a horizontally long shape, enabling impact to be dispersed at the flange portion 44B even in a case in which an impact has been input to the attachment portion 42 from a member to be attached 100 side. Further, in a case in which the flange portion 44B is formed in a circular shape with a large diameter, the size of the metal fitting housing portion 46 itself needs to be increased; however, by forming the flange portion 44B in a horizontally long shape, the length in the up-down direction can be shortened, and there is no need to increase the size of the metal fitting housing portion 46. Moreover, the horizontally long shape of the flange portion 44B enables the flange portion 44B to abut against the metal fitting housing portion and thereby suppress the attachment metal fitting 44 from rotating.

Moreover, in the present exemplary embodiment, since the gap S is provided between the metal fitting housing portion 46 and the attachment metal fitting 44, the attachment metal fitting 44 can be easily attached and detached. This enables the work efficiency of inserting the attachment metal fitting 44 into the metal fitting housing portion 46 to be improved. Further, the attachment metal fitting 44 can be easily modified according to a standard or the like of the member to be attached 100.

Moreover, as illustrated in FIG. 3, in the present exemplary embodiment, since the notch portion 46G for draining water is formed in the metal fitting housing portion 46, even in a case in which water has entered the metal fitting housing portion 46, water can be drained from the notch portion 46G, enabling the retention of water in the metal fitting housing portion 46 to be suppressed.

In particular, in the present exemplary embodiment, since notch portions 46G are formed at both left and right corner portions 46F of the metal fitting housing portion 46, it is possible to suppress water from remaining in the corner portions 46F. Moreover, as compared to a configuration in which the notch portion 46G is formed at only one location, drainage performance can be further improved.

Moreover, in the present exemplary embodiment, the insertion hole 46H is formed at an upper end portion of the metal fitting housing portion 46, and the notch portion 46G is formed at a lower end portion of the metal fitting housing portion 46 that is at the opposite side to the insertion hole 46H. This enables water to be drained from the notch portion 46G even in a case in which the water has entered from the insertion hole 46H to the back of the metal fitting housing portion 46.

Moreover, as illustrated in FIG. 5, in the present exemplary embodiment, the inclined portion 42B is formed at the inner wall of the insertion hole 46H, and water that has entered the metal fitting housing portion 46 is guided to the notch portion 46G by the inclined portion 42B. This enables water inside the metal fitting housing portion 46 to be efficiently drained. As described above, the vehicle electroacoustic transducer 10 of the present exemplary embodiment enables degradation of the case 11 due to residual water to be suppressed.

As illustrated in FIG. 3, in the above-described exemplary embodiment, the boss portion 60 bulges out from the attachment surface 18A of the case 11, and the boss portion 60 is in contact with the member to be attached 100. Accordingly, in a state in which the case 11 is attached to the member to be attached 100, the case 11 is supported at plural locations of the attachment portion 42 and the boss portion 60, enabling resonance of the case 11 to be suppressed.

In particular, in the present exemplary embodiment, the attachment portion 42 is provided at an upper portion of the attachment surface 18A, and two boss portions 60 are provided at a lower portion of the attachment surface 18A. This enables the case 11 to contact the member to be attached 100 at three locations, enabling resonance of the case 11 to be effectively suppressed. Moreover, since a gap is provided between the case 11 and the member to be attached 100, excluding the attachment portions 42 and the boss portions 60, the speaker unit 16 need not be affected by heat even in an environment in which the temperature at the member to be attached 100 side becomes high.

Moreover, in the present exemplary embodiment, since the boss portion 60 is formed so as to protrude further to the rear side than the attachment portion 42, the boss portion 60 can be reliably brought into contact with the member to be attached 100 when the attachment portion 42 is attached to the member to be attached 100.

Further, the boss portion 60 is pressed against the member to be attached 100, enabling the occurrence of abnormal noise due to vibration of the case 11 to be suppressed. Namely, in a case in which the height of the attachment portion 42 and the height of the boss portion 60, with respect to the attachment surface 18A, are formed to be the same height as each other, there is a possibility of providing a slight gap between the boss portion 60 and the member to be attached 100 due to design errors, assembly errors, and the like. In this case, the diaphragm 32 is vibrated by actuating the vehicle electroacoustic transducer 10, and there is a possibility of abnormal noise being generated by contact between the boss portion 60 and the member to be attached 100.

In this regard, by employing a configuration in which the boss portion 60 is pressed against the member to be attached 100 as in the present exemplary embodiment, a slight gap is not provided between the boss portion 60 and the member to be attached 100, enabling generation of abnormal sounds to be suppressed.

Moreover, in the present exemplary embodiment, since a distal end of the attachment portion 42, namely the rear wall 46A of the metal fitting housing portion 46 is formed in a plane, the attachment portion 42 and the member to be attached 100 can be attached in a state in which they are in surface contact with each other, enabling the attached state to be stabilized.

On the other hand, since the distal end of the boss portion 60 is spherical, the boss portion 60 can support the case 11 in a state in which the boss portion 60 and the attached member 100 are in point contact with each other.

Moreover, in the present exemplary embodiment, the front cover 12 is attached to the diaphragm side (front side) of the case main body 14, and the rear cover 18 is attached to the side opposite to the diaphragm 32 (rear side) of the case main body 14. In this manner, by employing a configuration in which the front cover 12 and the rear cover 18 are provided separately from the case main body 14 that holds the speaker unit 16, only the case main body 14 needs to be modified when the design of the speaker unit 16 is modified. Namely, the speaker unit 16 can be held by modifying the internal structure of the case main body 14 in response to a design change of the speaker unit 16. Moreover, unless the external structure of the case main body 14 is modified, the front cover 12 and the rear cover 18 can be attached in the same manner as before the design modification.

Moreover, in the present exemplary embodiment, changes in the use and use environment of the vehicle electroacoustic transducer 10 can be accommodated simply by changing the front cover 12 or the rear cover 18. In particular, in the present exemplary embodiment, since the attachment portion 42 is formed on the rear cover 18, the vehicle electroacoustic transducer 10 can be attached simply by changing the rear cover 18 according to the specification of the member to be attached 100. For example, in an environment in which fastening portions at plural locations are required, if the rear cover 18 is modified to prepare a rear cover having plural attachment portions 42 formed thereon, the vehicle electroacoustic transducer 10 can be attached without modifying the design of the case main body 14 or the front cover 12.

Moreover, in the present exemplary embodiment, the rear cover 18 seals a space to the rear side of the case main body 14, and the attachment portion 42 is formed outside the rear cover 18. This enables foreign matter to be suppressed from entering the interior of the case main body 14 from a rear cover 18 side, in comparison to a configuration in which the attachment portion 42 is in communication with the internal space of the case main body 14.

Further, as illustrated in FIG. 1, in the present exemplary embodiment, the external space and the internal space of the case main body 14 are connected through the communication portion 14C. Accordingly, even in a case in which the temperature, atmospheric pressure, or the like has changed between the external space and the internal space of the case main body 14, air flows into and out of the space between the external space and the internal space through the communication portion 14C, enabling the diaphragm 32 to be suppressed from being deformed. Moreover, since the filter member prevents liquid from passing through the communication portion 14C, the inflow of liquid into the internal space of the case main body 14 can be suppressed.

Moreover, in the above-described aspect, sound output from the speaker unit 16 is transmitted to the outside through the slits 12A that are formed in the front cover 12. Further, since the portion that faces the plug 40 that protects the filter member is the closed portion 12B, the filter member can be satisfactorily protected even in a case in which foreign matter, water droplets, and the like are sprayed onto the front cover 12.

Supplementary Explanation

Although explanation has been given regarding the vehicle electroacoustic transducer 10 according to the exemplary embodiment, obviously various embodiments may be implemented within a range not departing from the gist of the present invention. For example, although the attachment portion 42 is provided at the upper end portion of the attachment surface 18A as illustrated in FIG. 3 in the above-described exemplary embodiment, there is no limitation thereto, and the attachment portion 42 may be provided at another location. Namely, the attachment portion 42 may be provided at a central portion of the attachment surface 18A. Alternatively, the plural attachment portions 42 may be provided on the attachment surface 18A.

Although two boss portions 60 are provided on the attachment surface 18A in the above-described exemplary embodiment, there is no limitation thereto. For example, the boss portions 60 may not be provided.

Moreover, as illustrated in FIG. 1, although the speaker unit 16, which generates sound by causing reciprocating movement of the voice coil 30, is employed in the above-described exemplary embodiment, there is no limitation thereto. For example, a speaker unit that generates sound using another structure may be adopted.

Moreover, in the above-described exemplary embodiment, although the structure of a so-called outsert is adopted in which the attachment metal fitting 44 is inserted into the insertion hole 46H of the metal fitting housing portion 46, there is no limitation thereto.

Further, although in the above-described exemplary embodiment, as illustrated in FIG. 3, the notch portions 46G are formed at the left and right corner portions 46F of the metal fitting housing portion 46, there is no limitation thereto. For example, the same notch portions as the notch portions 46G may be formed in the rear wall 46A, the side walls 46B, and the lower wall 46C of the metal fitting housing portion 46.

Moreover, in the above-described exemplary embodiment, as illustrated in FIG. 5, although the inclined portion 42B that configures part of the inner wall of the metal fitting housing portion 46 is inclined toward the notch portion 46G, there is no limitation thereto. For example, in addition to the inclined portion 42B, a configuration in which the front-rear wall portion 42C is inclined toward the notch portion 46G may be adopted. In this case, by forming the front-rear wall portion 42C as an inclined portion that is inclined from the center in the left-right direction to the right end and an inclined portion that is inclined from the center in the left-right direction to the left end, water on the front-rear wall portion 42 can be effectively guided to the notch portion 46G. Alternatively, the vertical wall portion 42A may be inclined. For example, by making the vertical wall portion 42A inclined to the front side from the lower end toward the upper end, even in a case in which the case 11 is attached to the member to be attached 100 so that the vertical wall portion 42A is positioned below, water that has entered inside the metal fitting housing portion 46 from the insertion hole 46H can be effectively drained from the insertion hole 46H.

Moreover, in the above-described exemplary embodiment, although the left and right corner portions 46F are formed in an inverted corner shape, there is no limitation thereto, and the left and right corner portions 46F may be formed in a protruding corner shape. Further, the notch portion 46G may be formed only on the side of the side walls 46B or may be formed only on the side of the lower wall 46C.

The disclosure of Japanese Patent Application No. 2022-053454 is hereby incorporated by reference in its entirety.

All documents, patent applications, and technical standards described herein are incorporated by reference to the same extent as if the individual documents, patent applications, and technical standards were specifically and individually described as being incorporated by reference.

The invention claimed is:

1. A vehicle electroacoustic transducer, comprising:

a speaker unit that generates sound;

a case that is formed in a box shape and that houses the speaker unit; and an attachment portion that is formed at the case and that is attachable, by a fastener, to a member to be attached which is outside a vehicle cabin, wherein:

the attachment portion includes an attachment metal fitting into which the fastener is screwed, and a metal fitting housing portion that houses the attachment metal fitting, a drain hole for draining water is formed at the metal fitting housing portion, an insertion hole, into which the attachment metal fitting is insertable, is formed in the metal fitting housing portion; and the drain hole is formed in a side of the metal fitting housing portion which is opposite an insertion hole opening.

2. The vehicle electroacoustic transducer according to claim 1, wherein the drain hole is formed at a plurality of locations at the metal fitting housing portion.

3. The vehicle electroacoustic transducer according to claim 1, wherein the drain hole is formed at a corner portion configuring the metal fitting housing portion.

4. The vehicle electroacoustic transducer according to claim 1, wherein an inclined portion, which is inclined toward the drain hole, is formed at an inner wall of the metal fitting housing portion.

* * * * *